Aug. 14, 1923.

H. G. CORDLEY 1,464,561

FAUCET

Filed June 16, 1921

Inventor.
H. G. Cordley
by A. P. Greeley
Attorney

Patented Aug. 14, 1923.

1,464,561

UNITED STATES PATENT OFFICE.

HENRY G. CORDLEY, OF GLEN RIDGE, NEW JERSEY.

FAUCET.

Application filed June 16, 1921. Serial No. 477,943.

*To all whom it may concern:*

Be it known that I, HENRY G. CORDLEY, a citizen of the United States, residing at Glen Ridge, in the county of Essex, State of New Jersey, have invented certain new and useful Improvements in Faucets, of which the following is a description, reference being had to the accompanying drawings, forming a part hereof.

My invention relates to faucets of the reciprocating plug, spring actuated type and has for its object to provide a faucet of this type of the simplest and least expensive construction which will be self-closing, easily taken apart for cleaning or replacement of worn parts, will not readily get out of order and will be effective in operation.

With the above described objects, and other objects hereinafter explained in view my invention consists in the construction and combination of elements hereinafter described and claimed.

Referring to the drawings.

Figure 1:
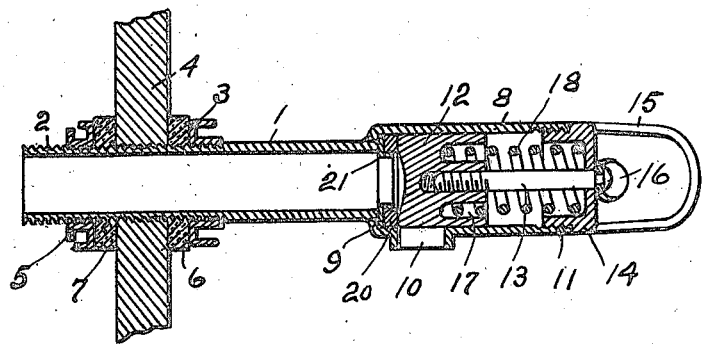
Figure 1 is a longitudinal central sectional view of a faucet embodying my invention, showing the faucet closed.

In the drawings 1 indicates the inner member of the faucet casing consisting of a piece of straight tubing screwthreaded in its rear portion as shown at 2 to receive a nut 3 on the outside of the wall 4 of the tank from which liquid is to be drawn, and a nut 5 on the inside of the wall 4, these nuts bearing against gaskets 6 and 7 respectively, of rubber or other material adapted to be compressed to prevent leakage about the tube 1 where it passes through the usual faucet opening in the wall 4.

8 indicates the outer member of the faucet casing also formed of a straight piece of tubing, having an abutment 9 formed at its inner end adapted to fit over and be secured on the forward end of the inner casing member 1. Near its rear end this outer casing member has formed in its under side a discharge opening 10, and it is internally screwthreaded at its forward end as shown at 11.

12 indicates a cylindrical plug valve which fits within and is adapted to reciprocate in the outer casing member 8. This plug valve is carried by a valve rod 13 the inner end of which is here shown as screwthreaded into a central opening in the outer end of the plug, but may be connected to the plug in any other convenient manner it being essential only that the valve rod be so connected to the plug as to reciprocate with it. This valve rod extends through a central opening in a cap 14 which is exteriorly screwthreaded at its inner end to engage the screwthread 11 of the outer casing member 8, and carries on its outer end a guard strip or loop 15 for the cross bar 16 carried on the outer end of the valve rod 13. The plug 12 has formed in its outer end an annular recess 17 to receive the inner portion of a coiled spring 18 the outer portion of which is received in the cap 14. This spring 18 normally presses the plug inward away from the cap 14 as shown in Figure 1, closing the faucet.

Figure 2:
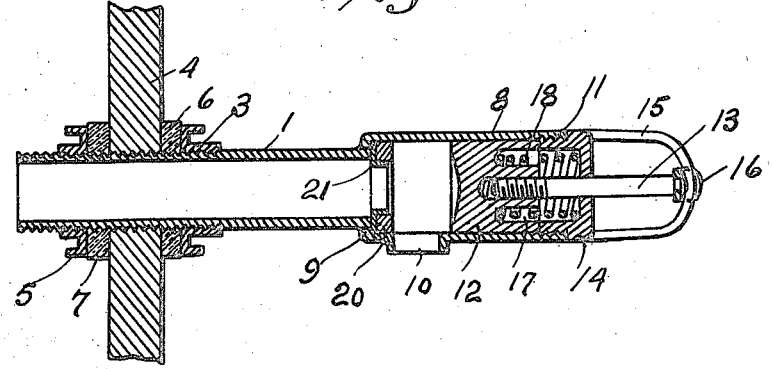
Figure 2 is a view similar to Figure 1 but showing the faucet open.
Figure 3:
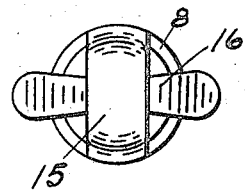
Figure 3 is a front end view of the faucet shown in Figures 1 and 2.
Figures 4, 5:
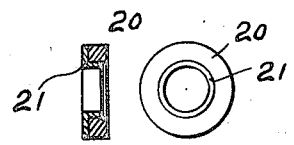
Figures 4 and 5 show the packing ring in vertical section and end view, respectively.

The ends of the cross bar 16 on the forward end of the valve rod 13 extend beyond the lines of the casing member 8 so as to serve as finger holds for the index and middle fingers of the person using the faucet, his thumb being pressed against the outer end of the guard 15. By drawing in the fingers the plug 12 will be drawn forward against the resistance of the spring 18 to the position in which it is shown in Figure 2, exposing the opening 10 and permitting liquid to flow from the tank. On releasing the hold on the cross bar 16 the spring forces the plug rearward past the opening 10, shutting off the flow of liquid, the inner end of the plug seating itself against the outer end of the inner member 1 of the faucet casing or preferably, against a packing ring 20 carried on the end of this inner casing member.

The packing ring 20 is formed of any slightly compressible material and may be made of wood, wood fibre or rubber. It is preferably carried by a ring 21 of metal, L shaped in cross section, having its inner diameter slightly less than the inner diameter of the inner casing member 1 so that, when in place, its inner edge forms a narrow annular ledge extending into the bore of the inner casing member. When it is desired to remove a packing ring which has become worn all that is necessary, the cap 14 being unscrewed and removed with the plug 12, is to insert a rod of suitable diameter through the rear end of the casing member 1 and push the packing ring out through the outer casing member, or, by means of a suitably hooked instrument to reach in through the front end of the casing member 8 and, after engaging its hook with the ring 21, drawing it, with the ring 20, out through the casing member 8.

Having thus described my invention what I claim is;

1. In a reciprocating plug faucet, the combination of a faucet casing comprising an inner member formed of straight tubing having its outer end adapted to serve as a seat for the plug, and an outer member also formed of straight tubing having its internal diameter greater than the external diameter of the inner member and having an abutment at its inner end fitting over and secured on the end of the inner member and having a discharge opening in its lower side, and a plug adapted to reciprocate in the outer casing member and to close the discharge opening, means for holding the plug against the seat formed by the inner end of the inner casing member, a packing ring carried on the valve seat comprising a ring of yielding material carried by a ring of non-yielding material having its inner diameter less than the inner diameter of the inner casing member.

2. In a reciprocating plug faucet, the combination of a faucet casing comprising an inner member formed of straight tubing having its outer end adapted to serve as a seat for the plug, and an outer member also formed of straight tubing having its internal diameter greater than the external diameter of the inner member and having an abutment at its inner end fitting over and secured on the end of the inner member and having a discharge opening in its lower side, and a plug adapted to reciprocate in the outer casing member and to close the discharge opening, means for holding the plug against the seat formed by the inner end of the inner casing member, a packing ring carried on the valve seat comprising a ring of yielding material carried by a ring of non-yielding material L-shaped in cross section having its inner diameter less than the inner diameter of the inner casing member, and means for drawing the plug away from the valve seat.

3. In a reciprocating plug faucet, the combination of a faucet casing comprising an inner member formed of straight tubing having its outer end adapted to serve as a seat for the plug, and an outer member also formed of straight tubing having its internal diameter greater than the external diameter of the inner member and having an abutment at its inner end fitting over and secured on the end of the inner member and having a discharge opening in its lower side, and a plug adapted to reciprocate in the outer casing member and to close the discharge opening, a spring normally holding the plug against the seat formed by the inner end of the inner casing member, and means for drawing the plug away from its seat comprising a cap secured in the outer end of the outer casing member, a valve rod connected to the plug and extending through the cap and a cross bar on the outer end of the valve rod.

4. In a reciprocating plug faucet, the combination of a faucet casing comprising an inner member formed of straight tubing having its outer end adapted to serve as a seat for the plug, and an outer member having its internal diameter greater than the external diameter of the inner member and having an abutment at its inner end fitting over and secured on the end of the inner member and having a discharge opening in its lower side, and a plug adapted to reciprocate in the outer casing member and to close the discharge opening, a spring normally holding the plug against the seat formed by the inner casing member, and means for drawing the plug away from its seat comprising a cap secured in the end of the outer casing member having a guard loop on its outer end, a valve rod connected to the plug and extending through the cap, and a cross bar on the outer end of the valve rod within the guard loop having its ends extending outward beyond the line of the periphery of the cap.

In testimony whereof I affix my signature this thirteenth day of June, 1921.

HENRY G. CORDLEY.